US008460819B2

(12) United States Patent
Fredriksson et al.

(10) Patent No.: US 8,460,819 B2
(45) Date of Patent: Jun. 11, 2013

(54) BATTERY STACK ARRANGEMENT

(75) Inventors: Lars Fredriksson, Täby (SE); Neil H. Puester, Aurora, CO (US); Richard Howlett, Denver, CO (US)

(73) Assignee: Nilar International AB, Täby (SE)

( * ) Notice: Subject to any disclaimer, the term of this patent is extended or adjusted under 35 U.S.C. 154(b) by 1304 days.

(21) Appl. No.: 12/161,161

(22) PCT Filed: Jan. 15, 2007

(86) PCT No.: PCT/EP2007/050344
§ 371 (c)(1),
(2), (4) Date: Jul. 16, 2008

(87) PCT Pub. No.: WO2007/082863
PCT Pub. Date: Jul. 26, 2007

(65) Prior Publication Data
US 2010/0151306 A1 Jun. 17, 2010

(30) Foreign Application Priority Data
Jan. 17, 2006 (SE) ........................ 0600100

(51) Int. Cl.
*H01M 2/08* (2006.01)
(52) U.S. Cl.
USPC ............. 429/172; 429/99; 429/100; 429/135; 429/138; 429/148; 429/152; 429/153; 429/163
(58) Field of Classification Search
USPC .................. 429/99–100, 130, 135, 138–139, 429/142, 144, 146, 148, 149, 152, 153, 158, 429/161, 163, 167, 172, 177, 185, 186
See application file for complete search history.

(56) References Cited

U.S. PATENT DOCUMENTS

| 4,037,031 | A | * | 7/1977 | Jacob | ............................. 429/149 |
| 5,374,490 | A | | 12/1994 | Aldecoa | |
| 2003/0008205 | A1 | | 1/2003 | Horie et al. | |
| 2003/0017387 | A1 | | 1/2003 | Marukawa et al. | |
| 2004/0253512 | A1 | * | 12/2004 | Watanabe et al. | ............. 429/210 |
| 2005/0250005 | A1 | | 11/2005 | Bacon et al. | |
| 2008/0090144 | A9 | * | 4/2008 | Puester et al. | ................ 429/185 |

FOREIGN PATENT DOCUMENTS

| EP | 1 117 138 A1 | 7/2001 |
| EP | 1 139 483 A1 | 10/2001 |
| EP | 1 424 744 A1 | 6/2004 |
| EP | 1 610 407 A1 | 12/2005 |

(Continued)

*Primary Examiner* — Patrick Ryan
*Assistant Examiner* — Ben Lewis
(74) *Attorney, Agent, or Firm* — Capitol City TechLaw

(57) ABSTRACT

The present invention relates to a battery stack arrangement (50) comprising at least one bipolar battery. Each bipolar battery comprises a plurality of battery cell arranged between endplates (22,23). Each battery cell is provided with a seal (24) arranged around the entire periphery of each cell, and a sealing pressure Fseal is applied over the seal to prevent electrolyte leakage between adjacent cells. The battery stack arrangement further comprises a mounting frame (57) including: at least two mounting units (58,59) and at least one tie unit (60, 60', 60") holding said mounting units together. The bipolar battery is arranged between the mounting units (58, 59), and the battery stack arrangement further comprises at least one spacing element (61) arranged between the mounting units (58,59) and each spacing element (61) abuts against at least one endplate (22,23) and is held in place by said mounting frame (57) to create a stack pressure Fstack, independent of the sealing pressure Fseal. The stack pressure is controlled by the tie unit.

10 Claims, 4 Drawing Sheets

FOREIGN PATENT DOCUMENTS

| | | |
|---|---|---|
| JP | 2000-48867 A | 2/2000 |
| JP | 2001-23702 | 1/2001 |
| WO | WO 94/02969 * | 2/1994 |
| WO | WO 03/026042 A1 | 3/2003 |
| WO | WO 2004/042846 A1 | 5/2004 |
| WO | WO 2004/051767 A1 | 6/2004 |
| WO | WO 2006/104442 A1 | 10/2006 |

* cited by examiner

BATTERY STACK ARRANGEMENT

TECHNICAL FIELD

The present invention relates to a battery stack arrangement, especially intended for bipolar batteries in hybrid vehicles.

BACKGROUND TO THE INVENTION

An essential feature to obtain a good performance of a bipolar battery of the type as disclosed in the published international patent application WO 2005/048390 is a low internal resistance between the terminals. This is achieved by applying a pressure over a plurality of battery cells using a hydrophobic gasket around the entire periphery of each battery cell to prevent electrolyte bridges to be formed between adjacent battery cells. A drawback with prior art batteries is that the amount of pressure applied over the gasket will also be more or less applied over the stacked battery components of the battery cells. Also, the internal resistance is dependent on the level of contact that exists between the battery components, and thus the magnitude of mechanical load on the battery stack. An increased pressure will result in a lower internal resistance, but there are limits to what degree the pressure may be increased without introducing other undesired effects, such as high mechanical stress on the casing.

Bipolar batteries are well known in the prior art, especially stacked bipolar batteries as is disclosed in U.S. Pat. No. 5,374,490 and EP 1 424 744. However, there is a problem with all disclosed prior art batteries in that the electrodes inside each battery cell will change in thickness during operation and which in turn will create a pressure on the casing. The casing may then crack and the battery malfunction due to stress on the casing and an increased internal resistance.

This problem has been addressed in the published international application WO 2006/104442, assigned to the same applicant, and a casing is proposed that has a mechanically compliant arrangement built into the casing of the battery to reduce the forces on the cell stack caused by changes in cell thickness during operation. However, the pressure applied to the sealing gasket around the periphery of each cell is still dependent of the pressure applied to the stacked internal components to maintain a good contact to obtain a low internal resistance.

Thus there is a need for a battery stack arrangement that will permit the internal resistance to be maintained at an acceptable level during normal operation independently of the pressure needed to create a sealed bipolar battery.

SUMMARY OF THE INVENTION

The object with the present invention is to provide a stack arrangement for a bipolar battery wherein an internal resistance within the battery may be established independently of the pressure needed to create a sealed bipolar battery.

A solution to this object is provided in a stack arrangement wherein a seal pressure and a stack pressure of a stacked bipolar battery are separated using a spacing element that abut against the stacked components of the bipolar battery.

An advantage with the present invention is that a well controlled seal pressure may be applied to create a sealed configuration for the cells in the bipolar battery.

Still another advantage is that the internal resistance of a bipolar battery may be set to an acceptable value even after the bipolar battery has been assembled, since the stack pressure is applied to the stacked components of the battery cell by an externally arranged mounting frame.

A further advantage, in a preferred embodiment, is that a cooling medium may be arranged to flow between stacked batteries since a distance is created between adjacent batteries.

Further advantages will be apparent to a skilled person in the art from the following detailed description.

DETAILED DESCRIPTION OF THE PREFERRED EMBODIMENTS

Each battery cell in a bipolar battery comprises a negative electrode and a positive electrode with a separator arranged between them. Each electrode comprises a non-metallic substrate, which makes them less expensive. Each cell is separated from each other by an electrically conductive biplate, and a positive endplate and negative endplate, respectively, are arranged on each side of the cell stack. The battery is preferably provided with a common gas space, disclosed in the published international patent application WO 03/026042, assigned to the same applicant, to distribute the pressure within the battery due to gassing, but the present invention may be implemented in a bipolar battery having at least one separately arranged battery cell.

Upon initial electrical cycling of the bipolar battery, the electrodes will irreversibly swell. The swelling of the electrodes can produce huge forces when contained in a stiff casing because the elastic modulus of the electrodes themselves is very high. This can lead to crushed separators and fracture yield of lower cost casing materials, such as thermoplastics.

The disclosed prior art casing in the published international application WO 2006/104442, which is hereby incorporated by reference, is trying to combine two pressures on stacked battery components in a bipolar battery without the risk of the casing cracking due to internally created gas pressure which occur during normal operation in a sealed bipolar battery. A first pressure, herein named "seal pressure" is needed to maintain the cell integrity and thereby prevent electrolyte from creating electrolyte bridges between adjacent cells. A second pressure, herein called "stack pressure" is needed to create a contact between the stacked battery components, i.e. endplates, biplates, electrodes and separators, inside the battery to obtain a low internal resistance.

Figure 1:
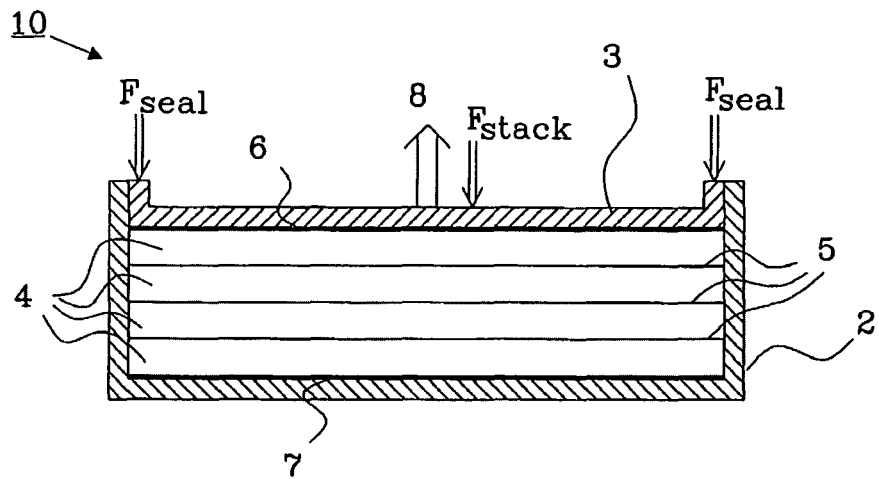
FIG. 1 shows a cross-sectional view of a prior art bipolar battery.

FIG. 1 illustrates the forces applied to the prior art casing of an assembled sealed bipolar battery 10 having a casing comprising two parts, a case 2 and a lid 3. A cell stack comprising four cells 4, each separated from one another with a biplate 5, is provided within the casing together with a positive endplate 6 and a negative endplate 7. A common gas space is preferably provided as is known in the prior art. The electrodes are provided with non-metallic substrates as is disclosed in the published international patent application WO2004/042846. The lid 3 is inserted into the case 2 and held in place using a force indicated by the arrows denoted $F_{seal}$ which creates a pressure which is higher than the needed seal pressure as defined above since a similar force $F_{stack}$ is needed over the stacked battery cells 4 to counteract the pressure created inside the battery cells during operation.

In the prior art design, the lid 3 deflects somewhat, as indicated by the arrow 8, when the cell stack height changes, the resulting stress in the material of the casing is less than if the casing were stiffer. However, the lid 3 has an upper boundary on how stiff it can be in order to ensure that the stack forces are below the maximum allowed, and there is also a lower boundary on the lid stiffness, most likely set by the allowable deflection of the lid under an additional load of gas pressure originating from gassing in the battery cells.

The purpose of the invention is to provide a battery wherein the seal pressure, i.e. the pressure applied over the gaskets around the entire periphery of the battery cell, and the stack pressure, i.e. the pressure applied over the battery stack, may be independently controlled.

Figure 2A:
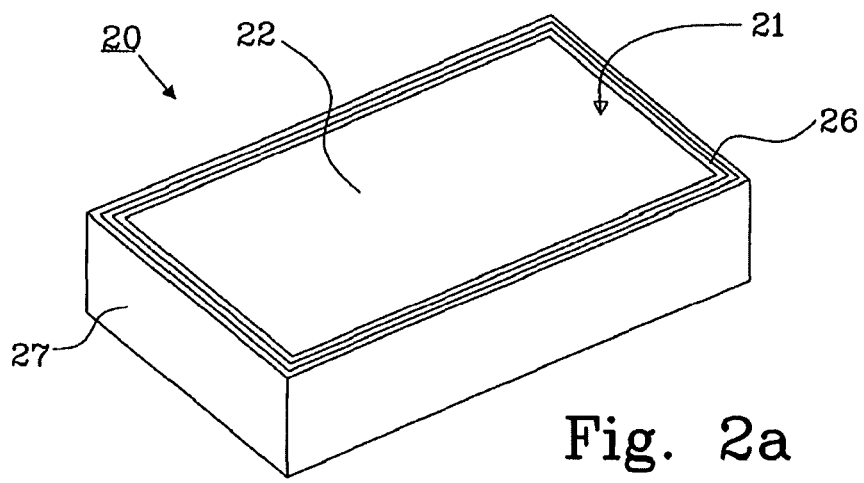
FIGS. 2a and 2b show a first embodiment of a bipolar battery adapted to be used in a battery stack arrangement according to the invention.
Figure 2B:
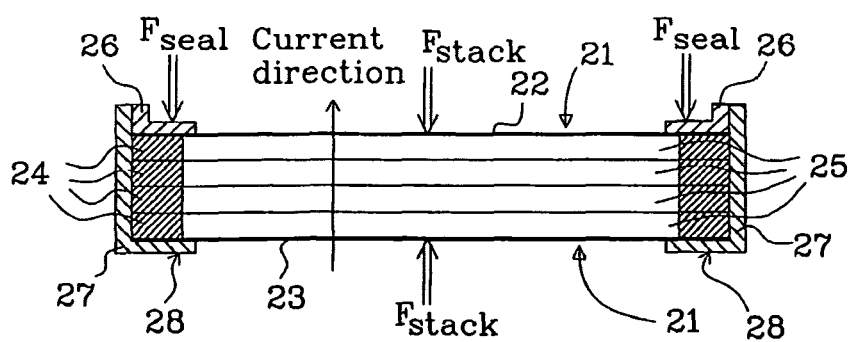

FIGS. 2a and 2b shows a perspective view and a cross-sectional view of a first embodiment of a battery 20 adapted to be used in a battery stack arrangement according to the invention. The casing comprises two parts, a case 27 and a lid 26, wherein the bottom of the case 27 and the lid 26 are provided with an opening 21. The openings 21 are provided in the casing on each side of the battery 20 in the current direction, and thus, the lid 26 is in the shape of a frame and a rim 28 is provided around the periphery of the bottom of the case 27. A positive endplate 22 and a negative endplate 23 are accessible through the opening 21 provided on each side, and therefore there is no need for conventional terminals attached to each endplate, but conventional terminals may naturally be provided as illustrated below. A sealing component, such as a gasket 24, is provided around the entire periphery of each cell 25. The gaskets 24 are contained between the lid 26 (i.e. the frame) and the rim 28 of the case 27, and the necessary seal pressure $F_{seal}$ needed to ensure a sealed configuration of the battery is created and maintained by compressing the gaskets and securing the lid 26 to the case 27. The stack pressure $F_{stack}$ is applied through the openings 21 to the center of the battery cells. The stack pressure may be adjusted when an external force is applied to a first embodiment of a spacing element, which is shown in the shape of a folded metal plate below.

Figure 3A:
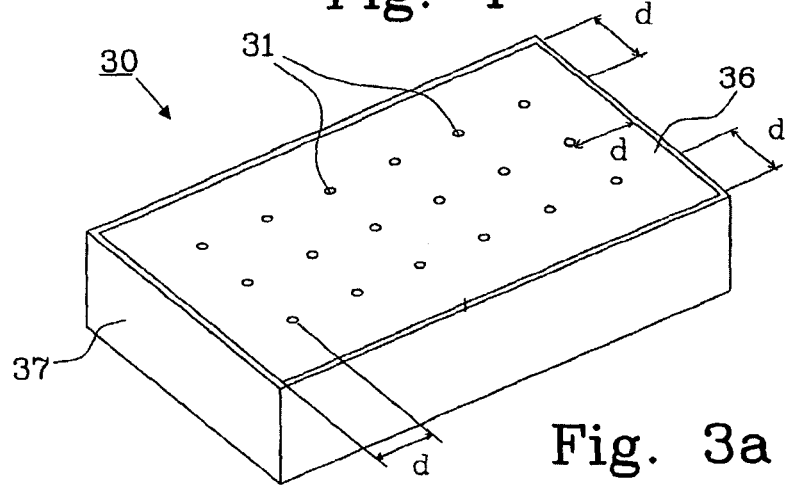
FIGS. 3a and 3b show a second embodiment of a bipolar battery adapted to be used in a battery stack arrangement according to the invention.
Figure 3B:
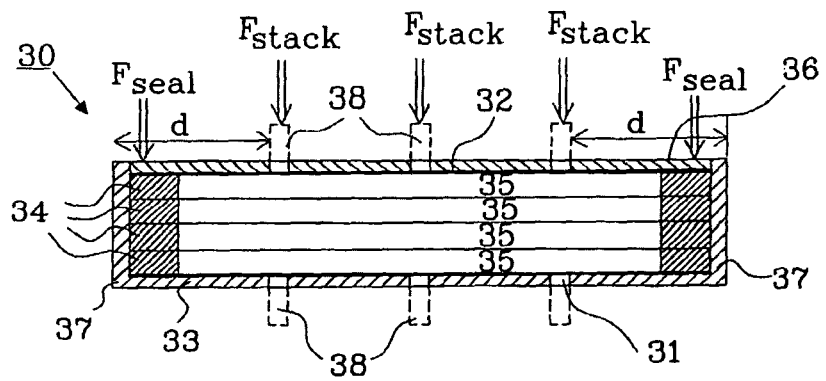

FIGS. 3a and 3b shows a perspective view and a cross-sectional view of a second embodiment of a battery 30 adapted to be used in a battery stack arrangement according to the invention. The casing comprises two parts, a case 37 and a lid 36, wherein the bottom of the case 37 and the lid 36 are provided with a plurality of openings in the shape of holes 31. The holes 31 are provided in the casing on each side of the battery 30 in the current direction, and are positioned at least a predetermined distance "d" from the periphery of the lid 36 and the periphery of the bottom of the case 37. A positive endplate 32 and a negative endplate 33 are accessible through the holes 31 provided on each side, and therefore there is no need for conventional terminals attached to each endplate, but conventional terminals may naturally be provided as illustrated below. A sealing component, such as a gasket 34, is provided around the entire periphery of each cell 35. The gaskets 34 are contained between the lid 36 and the bottom of the case 37, and the necessary seal pressure $F_{seal}$ needed to ensure a sealed configuration of the battery is created and maintained by compressing the gaskets and securing the lid 36 to the case 37. The stack pressure $F_{stack}$ is applied through the holes 31 provided to several central parts of the battery cells. The stack pressure may be adjusted when an external force is applied to a second embodiment of a spacing element, which is indicated by dashed lines 38 in the shape of a pin, preferably made from a conductive material.

Figure 4:
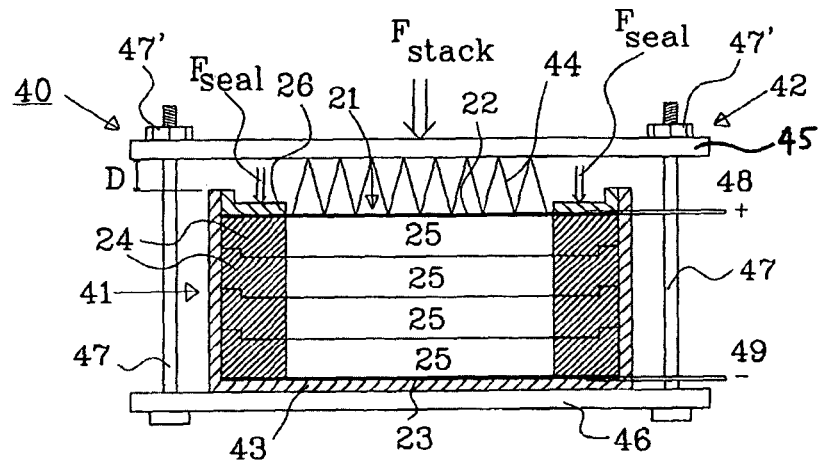
FIG. 4 shows a first embodiment of a battery stack arrangement according to the invention.

FIG. 4 shows a first embodiment of a battery stack arrangement 40 including a bipolar battery 41 and a mounting frame 42 arranged around the bipolar battery 41. The bipolar battery is similar to the battery described in connection with FIGS. 2a and 2b, with the exception that only one opening 21 is provided in the lid 26. Thus, there is no opening provided in the case 43. The seal pressure over the gaskets 24 is created an maintained by compressing the gaskets 24 and securing the lid 26 to the case 43, and the stack pressure is provided using a spacing element in the shape of a folded plate 44, preferably made from a metal. The folded plate is positioned to abut against the positive endplate 22 through the opening 21. The mounting frame comprises a first mounting unit 45 and a second mounting unit 46, which are tied together using several tie units in the shape of tie rods 47 and nuts 47'. The bottom of the battery case 43 is placed on top eof the second mounting unit 46 and the folded plate 44 is positioned between the positive endplate 22 and the first mounting unit 45. The stack pressure $F_{stack}$ may now be controlled independently of the seal pressure $F_{seal}$ by turning the nuts 47' on the tie rods 47. The mounting units 45 and 46 are insulated in this example and are preferably flexible to accommodate any changes in cell thickness that will occur during normal operation of the battery. A positive terminal 48 and a negative terminal 49 are provided in this embodiment, which are connected to the positive endplate 22 and the negative endplate 23, respectively.

Furthermore, as an additional feature, a distance "D" is obtained between the bipolar battery 41 and the first mounting unit 45 due to the size of the folded plate 44, through which distance a cooling medium, such as air, water, etc. may flow to enhance the cooling of the battery 44 during operation.

Figure 5:
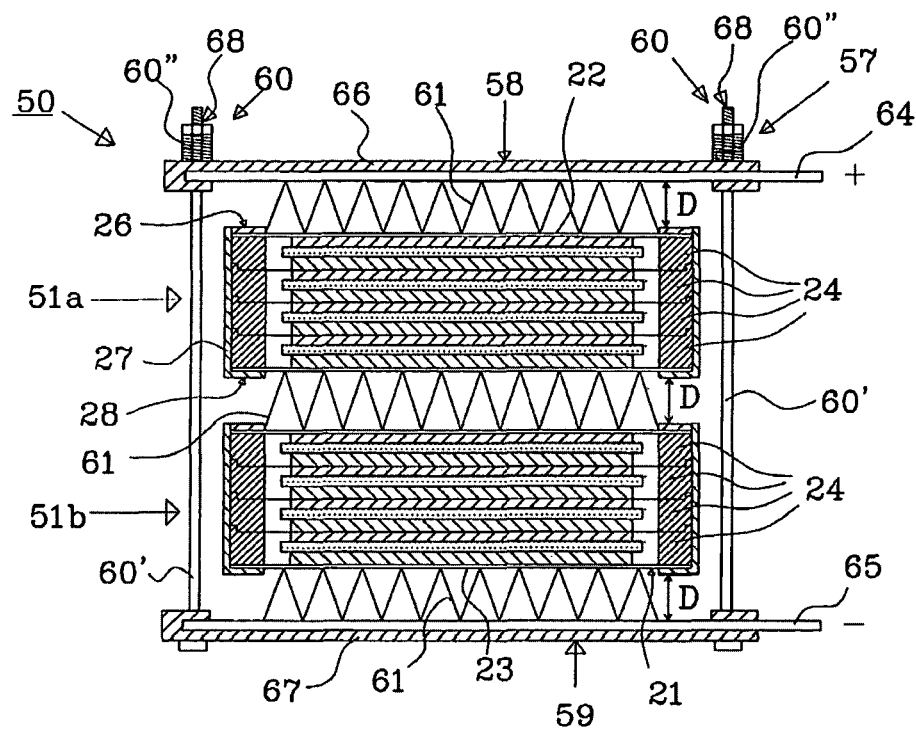
FIG. 5 shows a second embodiment of a battery stack arrangement according to the invention.

FIG. 5 shows a cross-sectional view of a second embodiment of a battery stack arrangement 50 having two bipolar batteries 51a, 51b each including four battery cells. Each battery is a bipolar battery having a design as described in connection with FIGS. 2a and 2b, wherein a gasket 24 is provided in each cell to create a hydrophobic barrier between each cell to prevent electrolyte bridges to form there between. To obtain these functions, a pressure must be applied over the stacked gaskets 24 around the entire periphery of the casing of each battery 51a, 51b. The casing comprises two parts, a case 27 and a frame 26, wherein the bottom of the case 27 is provided with an opening 21, whereby a rim 28 is formed around the periphery of the bottom. The gaskets 24 are contained between the frame 26 of the lid and the rim 28, and the gasket pressure $F_{seal}$ is created and maintained by compressing the gaskets and attaching the frame 26 to the case 27.

A mounting frame 57, comprising a first mounting unit 58 and a second mounting unit 59 together with spring biased tie units 60 including a tie rod 60', preferably insulated, and a self adjustable device 60" in the shape of a biased spring, is also provided around the batteries 51a, 51b which are stacked to be connected in series. A spacing element, such as a folded plate 61, abuts against both batteries 51a, 51b, and a similar spacing element 61 abuts against each battery and the first and second mounting unit, respectively. Thus, a distance D is created to permit a cooling medium to pass freely around each battery 51a, 51b. The spacing elements 61 are in this embodiment electrically conductive and placed within the frame 26 and rim 28 of the casing to make contact with the endplates 22, 23 within the battery and thus connect the batteries in series. It should be noted that there are no terminals provided on each battery 51a, 51b, and the endplates 22, 23, that are accessible from the outside due to the construction of the casing using a frame 26 and rim 28, function as built-in terminals.

The first mounting unit 58 comprises a positive terminal 64, which is covered with an electrically insulating material 66 to prevent unintentional touching of the positive terminal 64. The second mounting unit 59 comprises a negative terminal 65, which is also covered with an electrically insulating material 67 to prevent unintentional touching of the negative terminal 65. The spacing elements 61 will ensure that the internal electrical connection of the stacked batteries, having two batteries connected in series, is established.

A stack pressure $F_{stack}$, being separate from the gasket pressure $F_{seal}$ as described above, is applied to the batteries 51a, 51b by adjusting nuts 68 to achieve the desired tension. The electrodes inside each cell change their thickness during operation, which in turn will make the endplates 22, 23 to deflect due to a created internal pressure that will affect the mounting units 58, 59. The self adjusting device 60" of the tie unit 60 is present to absorb the exerted internal pressure without risking the battery to malfunction, e.g. by cracking the casing.

Figure 6:
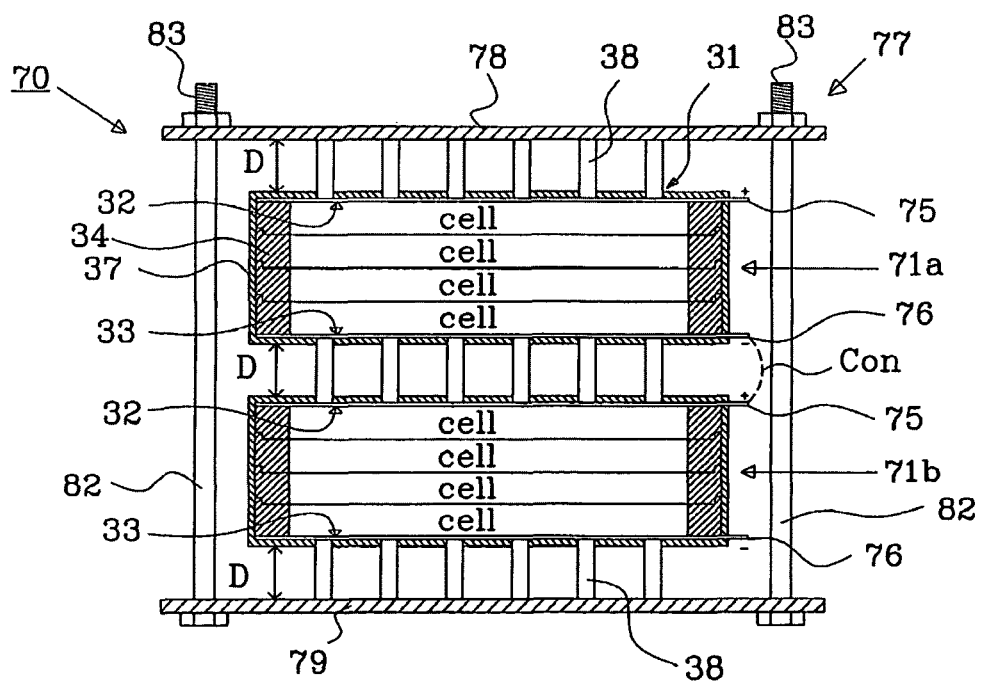
FIG. 6 shows a third embodiment of a battery stack arrangement according to the invention.

FIG. 6 shows a cross-sectional view of a third embodiment of a battery stack arrangement 70 having two batteries 71a, 71b as described in connection with FIGS. 3a and 3b. A pin 38 is provided in each hole 31 to create a distance D on each side of the batteries 71a, 71b to permit a cooling medium to pass by, and at the same time abut against the endplates 32, 33 inside the casing. Electrodes and separators are not shown inside each cell for clarity.

A mounting frame 77 is provided around the batteries 71a and 71b, with a first mounting unit 78 and a second mounting unit 79. The frame is held in place using tie units 82, such as tie rods, but other clamping arrangements may be used. The first and second mounting units are in this embodiment preferably made from an insulating material and are resilient to be able to accommodate the variations of thickness in the electrodes during operation. A seal pressure $F_{seal}$ over the gaskets 34 in each battery is created and maintained as discussed above, and a stack pressure $F_{stack}$ being independent of the seal pressure $F_{seal}$ is created by tightening nuts 83.

Each battery 71a, 71b is provided with a positive terminal 75, and a negative terminal 76. If the batteries should be connected in series, the pins 38 could be made from an electrically conductive material, thereby omitting the need to make a wired connection, as indicated in FIG. 6 by the dashed line denoted Con. Insulated pins 38 may naturally be used as long as the length of the pins provide the necessary force to create the stack pressure without affecting the casing of each battery.

Figure 7:
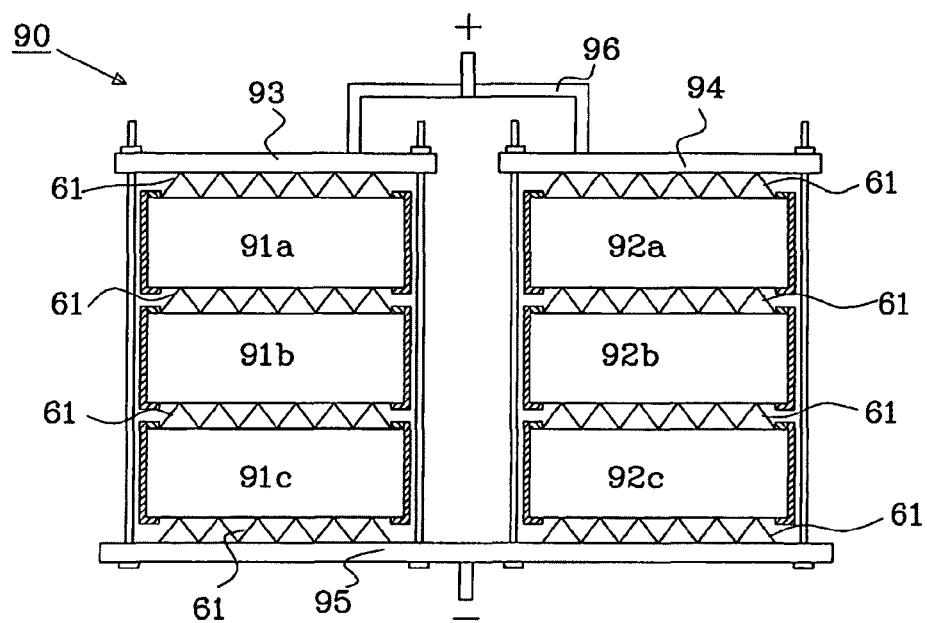
FIG. 7 shows a fourth embodiment of a battery stack arrangement according to the invention.

FIG. 7 shows a schematic cross-sectional view of a fourth embodiment of a battery stack arrangement 90 according to the invention. Three batteries 91a, 91b and 91c are arranged in a first battery stack and are connected in series, in a manner similar to the embodiment described in connection with FIG. 5. Furthermore, three additional batteries 92a, 92b and 92c are arranged in a second battery stack are also connected in series, in a manner similar to the embodiment described in connection with FIG. 5. A mounting frame comprising a first, second and third mounting unit 93, 94 and 95 are provided to maintain spacing elements 61 in position during operation.

The first and second mounting unit 93, 94 are used for respective battery stack, but the third mounting unit 95 is used for both battery stacks. Tie units interconnect the mounting units to form the mounting frame. Furthermore, the battery stacks are connected in parallel as illustrated in the figure with the connection 96.

In a preferred embodiment of the present invention, the described spacing elements, i.e. folded plate or pins, will provide the desired feature of separating the seal pressure from the stack pressure if they are brought in direct physical contact with at least one of the endplates of each battery through one or more openings in the casing. However, the spacing elements have to be able to move independent of the part of the casing where the openings are provided.

The invention claimed is:

1. A battery stack arrangement comprising:
   at least one bipolar battery including a plurality of battery cells arranged between a positive endplate and a negative endplate, each battery cell being provided with a seal arranged around the entire periphery of each battery cell, wherein a sealing pressure ($F_{seal}$) is applied over the seal to prevent electrolyte leakage between adjacent battery cells;
   a mounting frame including at least two mounting units and at least one tie unit holding said mounting units together;
   said at least one bipolar battery being arranged between a first mounting unit and a second mounting unit;
   at least one spacing element arranged between said first mounting unit and said second mounting unit, wherein said at least one spacing element abuts against at least one of said positive endplate and said negative endplate of the bipolar battery and is held in place by said mounting frame to create a stack pressure ($F_{stack}$), being separate from the sealing pressure ($F_{seal}$), which stack pressure is controlled by said at least one tie unit; and
   means to accommodate changes in battery cell thickness occurring during operation, said means being at least one of flexible mounting units, spring biased tie units, and biased resilient mounting units.

2. The battery stack arrangement according to claim 1, wherein said spacing element is a folded plate.

3. The battery stack arrangement according to claim 1, wherein said spacing element is a pin.

4. The battery stack arrangement according to claim 1, wherein said spacing element is made from an electrically conducting material.

5. The battery stack arrangement according to claim 1, wherein each bipolar battery is provided with an opening for each spacing element, through which opening each spacing element abuts against said at least one endplate.

6. The battery stack arrangement according to claim 1, wherein at least two of said bipolar batteries are connected in series.

7. The battery stack arrangement according to claim 1, wherein at least two of said bipolar batteries are connected in parallel.

8. The battery stack arrangement according to claim 1, wherein a distance (D) is created at least on one side of each bipolar battery, wherein a cooling medium may pass by each bipolar battery.

9. The battery stack arrangement according to claim 1, wherein said at least one tie unit is provided with an adjustable nut that control the stack pressure ($F_{stack}$) when turned.

10. A battery stack arrangement comprising:
    a first mounting unit, a second mounting unit, and a tie unit holding said first and said second mounting units together;

a bipolar battery arranged between said first and said second mounting units, said bipolar battery including
   a plurality of battery cells arranged between a positive endplate and a negative endplate, and
   a plurality of seals respectively arranged around the entire periphery of each battery cell, wherein a sealing pressure ($F_{seal}$) is applied over said plurality of seals;
a spacing element arranged between said first and said second mounting units, wherein said spacing element abuts against at least one of said positive and said negative endplates to create a stack pressure ($F_{stack}$), which is separate from said sealing pressure ($F_{seal}$), and which is controlled by said tie unit; and
means to accommodate changes in battery cell thickness occurring during operation, said means being at least one of a flexible mounting unit, a spring biased tie unit, and a biased resilient mounting unit.

* * * * *